(12) United States Patent
Notargiacomo

(10) Patent No.: US 10,263,703 B2
(45) Date of Patent: Apr. 16, 2019

(54) OPTICAL TRANSCEIVER MODULE FOR COMMUNICATIONS IN DAS SYSTEMS

(71) Applicant: TEKO TELECOM S.R.L., Castel San Pietro Terme (IT)

(72) Inventor: Massimo Notargiacomo, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 0 days.

(21) Appl. No.: 15/649,343

(22) Filed: Jul. 13, 2017

(65) Prior Publication Data
US 2018/0019819 A1 Jan. 18, 2018

(30) Foreign Application Priority Data

Jul. 13, 2016 (IT) .................. 102016000073455

(51) Int. Cl.
| | |
|---|---|
| *H04B 10/2575* | (2013.01) |
| *H04B 10/50* | (2013.01) |
| *H04B 10/40* | (2013.01) |
| *G02B 6/42* | (2006.01) |
| *H04J 14/02* | (2006.01) |
| *H04W 88/08* | (2009.01) |

(52) U.S. Cl.
CPC ......... *H04B 10/25753* (2013.01); *G02B 6/42* (2013.01); *H04B 10/40* (2013.01); *H04B 10/503* (2013.01); *H04J 14/02* (2013.01); *H04J 14/0278* (2013.01); *H04W 88/085* (2013.01)

(58) Field of Classification Search
CPC .............. H04B 10/25753; H04B 10/40; H04B 10/503; G02B 6/42; H04J 14/0278

USPC ......................................... 398/139, 138, 135
See application file for complete search history.

(56) References Cited

U.S. PATENT DOCUMENTS

| | | | | |
|---|---|---|---|---|
| 2009/0010649 | A1* | 1/2009 | Zuhdi ................. | H04J 14/0226 398/59 |
| 2009/0196630 | A1* | 8/2009 | Ishaug ................. | H04B 10/504 398/193 |

(Continued)

OTHER PUBLICATIONS

Italian Search Report dated May 10, 2017 from Italian Patent Application No. 201600073455 filed Jul. 13, 2016.

*Primary Examiner* — Oommen Jacob
(74) *Attorney, Agent, or Firm* — David B. Tingey; Bryant J. Keller; Kirton McConkie

(57) ABSTRACT

The optical transceiver module installable on the Master Unit side of a DAS system connectable to a plurality of Remote Units, comprises an uplink connector and a downlink connector connectable to a radio base station, first and second optical connectors connectable to the Remote Units, a downlink path for the connection between the downlink connector and the first and second optical connector, and an uplink path for the connection between the uplink connector and the first and second optical connectors, wherein the uplink path comprises a first coupler of the WDM type and a second coupler of the WDM type connected, respectively, to the first optical connector and to the second optical connector, and wherein the uplink path comprises first and second demultiplexers connected, respectively, to the outputs of the first coupler and of the second coupler and adapted to separate the optical signals coming from the Remote Units.

11 Claims, 6 Drawing Sheets

(56) References Cited

U.S. PATENT DOCUMENTS

| | | | |
|---|---|---|---|
| 2012/0120988 A1* | 5/2012 | Li ..................... | H04B 17/40 |
| | | | 375/211 |
| 2013/0177317 A1* | 7/2013 | Rospsha .......... | H04B 10/25754 |
| | | | 398/93 |
| 2015/0303984 A1* | 10/2015 | Braithwaite .......... | H04B 1/525 |
| | | | 455/78 |
| 2016/0294479 A1* | 10/2016 | Sone .................... | H04B 10/572 |
| 2017/0099100 A1* | 4/2017 | Bush ............... | H04B 10/25751 |
| 2018/0019819 A1* | 1/2018 | Notargiacomo ............................. | |
| | | | H04B 10/25753 |

* cited by examiner

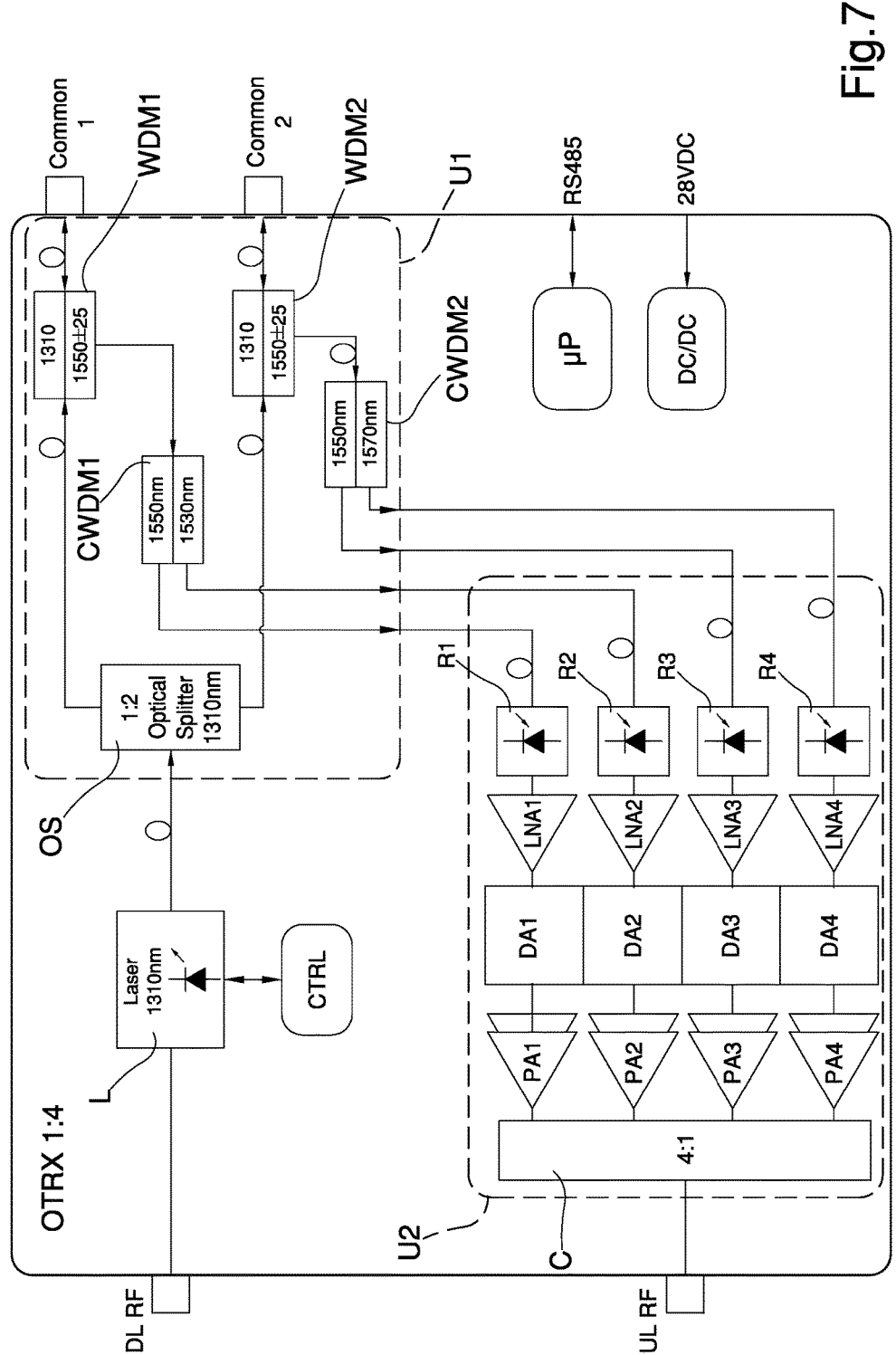

OPTICAL TRANSCEIVER MODULE FOR COMMUNICATIONS IN DAS SYSTEMS

CROSS REFERENCE TO RELATED APPLICATION[S]

This application claims priority to Italian Patent Application No. 102016000073455, filed Jul. 13, 2016, the disclosure of which is hereby incorporated entirely herein by reference.

BACKGROUND

Technical Field

The present invention relates to a transceiver module for optical communications in DAS systems.

State of the Art

In the field of telecommunications and with reference to the so-called DAS (Distributed Antenna System) systems, it is known the need to carry a plurality of different frequency bands through a single fiber optic analog link.

With reference to the downlink direction, in particular, the level of signals is generally under control, with limited dynamic variations most of the times.

In fact, generally the connection downlink is controlled by the radio base stations (Base Station) directly related to the DAS system through fixed attenuators. Therefore, changes in the level of the downlink signals are due solely to traffic load variations.

In a different way, with reference to the uplink connection the dynamic variations of the signals are much higher.

In fact, when several bands are involved there is the risk that intermodulation distortions due to strong signals cover the weak signals.

This is increasingly probable as much bandwidth the signal has (and with LTE and high data traffic rate this is more and more happening).

Furthermore, co-existence of multiple bands in the same optical link, due to the need of reducing the fiber counts when remotizing RF signals, can cause further intermodulation issues.

For example, FIG. 1 is a table that illustrates a typical application in the United States where all the main cellular bands are showed.

Therefore, in order to minimize the number of fibers and the number of Master Units modules, there is the need to have only one optical transmitter/receiver (OTRX) at Master Unit side, adapted to drive up to two Remote Units for frequency bands 700/800+850/1900/AWS3 (four bands) co-sited with two Remote units for frequency bands WCS/LTE2500TDD (two bands).

As shown in FIGS. 2 and 3, with reference to the state of the art the use of an optical transmitter/receiver OTRX 1:2 is known.

In particular, it is known to use an optical transmitter/receiver OTRX 1:2, provided with an uplink connector UL RF, a downlink connector DL RF and two optical connectors COMMON 1 and COMMON 2 connected, respectively, to a first and a second cluster CL1 and CL2.

With reference to the downlink path, the optical transmitter/receiver OTRX 1:2 is provided with laser L of the 1310 nm type connected to the downlink connector DL RF and controlled by a respective control unit CTRL.

The laser L is connected to an optical transmission/reception unit U comprising an optical splitter OS 1:2 of the 1310 nm type, connected in input to the laser L, and two WDM (Wavelength Division Multiplexing) couplers, indicated in the figures as WDM1 and WDM2, connected in input to respective outputs of the optical splitter OS and connected in output, respectively, to the first and second optical connector COMMON 1 and COMMON 2.

In particular, on each of the optical connectors COMMON 1 and COMMON 2 there is a WDM 1310 nm modulation for the signal in the downlink path and a WDM 1550 nm modulation for the uplink path signal coming from optical transmitters L1.1, L1.2, L2.1, L2.2 of the 1550 nm type of the Remote Unit RU1.1, RU1.2, RU2.1 RU2.2 and present, respectively, in the first cluster CL1 and CL2 in the second cluster.

In particular, in the clusters CL1 and CL2 each optical fiber path is connected to a 1:2 optical splitter OS1 and OS2 (of the 1310/1550 nm type) that feeds each cluster (four bands Remote Unit RU1.1 and RU2.1 and two bands Remote Unit RU1.2 and RU2.2).

The four bands Remote Units RU1.1 and RU2.1 are typically equipped with an optical transmitter L1.1 and L2.1 of the CWDM (Coarse WDM) 1550 nm (or, alternatively 1570 nm) type or DWDM (Dense WDM) channel 33 (1550.92 nm) type, while the two bands Remote Units RU1.2 and RU2.2 are equipped with an optical transmitter of the CWDM 1530 nm (or 1570 nm) type or DWDM channel 37 (1547.72 nm) type.

In FIG. 2, by way of example, a possible known solution is illustrated in which DWDM optical transmitters are used.

The optical transmitters of the two Remote Units of each cluster must have different wavelength in order to avoid band beats at the reception of the signals by each optical receiver OTRX 1:2.

In addition, the Remote Units RU1.1, RU2.1, RU1.2, RU2.2 are generally equipped, respectively, with optical receivers R1.1, R1.2, R2.1, R2.2 and each Remote Unit comprises a WDM coupler, showed in the Figures as WDM1.1, WDM1.2, WDM2.1 and WDM2.2.

Each WDM coupler, connected to the optical splitter of the 1310/1550 nm type OS1 and OS2 through the common optical input of each Remote Unit, allows separating the uplink signal coming from the optical transmitters L1.1, L1.2, L2.1, L2.2 from the downlink signal directed to the optical receivers R1.1, R1.2, R2.1, R2.2.

In the event that the Remote Units are equipped with optical transmitters L1.1, L1.2, L2.1, L2.2 of the CWDM type, then the couplers WDM1.1, WDM1.2, WDM2.1 and WDM2.2 and the 1:2 optical splitter OS1, OS2 have an higher bandwidth on the 1550 nm wavelength (eg. ±25 nm), compared to the case where the Remote Units are equipped with optical transmitters L1.1, L1.2, L2.1, L2.2 of the DWDM type.

With reference to the uplink path, the OTRX optical transmitter/receiver of the known type comprises a pair of optical receivers R1 and R2, a pair of low noise amplifiers LNA1 and LNA2, a pair of digital attenuators DA1 and DA2, a pair of power amplifiers PA1 and PA2 and a combiner C 2:1 connected to the uplink connector UL RF.

This known solution, however, has some drawbacks.

The main drawback of this solution, in fact, is that each optical receiver takes all the uplink signals: four frequency bands of the uplink signals of the Remote Units RU1.1 and RU2.1, to which are added two frequency bands of the uplink signals of the Remote Units RU1.2 RU2.2. Therefore, this solution can be susceptible to intermodulation distortion.

As known, if F1 and F2 are the frequencies of two beating signals, then second-order intermodulation products fall at frequencies (F2−F1) and (F2+F1).

Instead, third-order intermodulation products fall at (2×F1−F2) and (2×F2−F1).

For example, particularly critical is the second-order distortion where uplink signals in 1900 MHz (or AWS3) band beat with uplink signals in LTE2500TDD band, causing strong intermodulation products falling in 700 MHz uplink band (F2−F1).

For example, if F1=1880 MHz and F2=2590 MHz, then F2−F1=710 MHz

This is not acceptable since the intermodulation happens also when there are no signals or very weak signals in 700 MHz band, thus desensitizing the 700 MHz receiver of the base station.

Furthermore, a similar behavior happens when uplink signals in 700 MHz band beat with uplink signal in 1900 MHz band causing strong intermodulation products falling in LTE2500TDD band (F2+F1).

For example, if F1=780 MHz and F2=1850 MHz, then F2+F1=2630 MHz.

Therefore, since the dynamic of the uplink signals is very high and the bandwidth of these signals is broad, the probability to have this kind of issue is high.

SUMMARY

The main aim of the present invention is to provide an optical transceiver module for communications in DAS (Distributed Antenna System) systems, which allows eliminating the intermodulation distortions that commonly occur in known solutions.

Another object of the present invention is to provide an optical transceiver module for communications in DAS systems, which allows to overcome the mentioned drawbacks of the known art with a simple, rational solution, easy and effective to use and of low cost.

The above-mentioned objects are achieved by the present optical transceiver module for communications in DAS systems according to the features of claim 1

Other characteristics and advantages of the present invention will become better evident from the description of two preferred, but not exclusive embodiments of an optical transceiver module for communications in DAS systems, illustrated by way of an indicative but non-limiting example in the accompanying drawings, in which:

BRIEF DESCRIPTION OF THE DRAWINGS

FIG. 7 is a block diagram that illustrates in detail the optical transceiver module of FIG. 6.

DETAILED DESCRIPTION OF EMBODIMENTS

With particular reference to FIGS. 4, 5, 6 and 7, it is indicated globally with the wording OTRX 1:4 an optical transceiver module for communications in DAS (Distributed Antenna System) systems, installable in particular on the Master Unit side a DAS system and connectable to a plurality of Remote Units clusters.

In particular, the optical transceiver module OTRX 1:4 comprises an uplink connector UL RF and a downlink connector DL RF connectable to a base station, and a first optical connector COMMON 1 and a second optical connector COMMON 2 connectable respectively to a first and to a second Remote Unit cluster CL1, CL2.

Figures 1, 2:
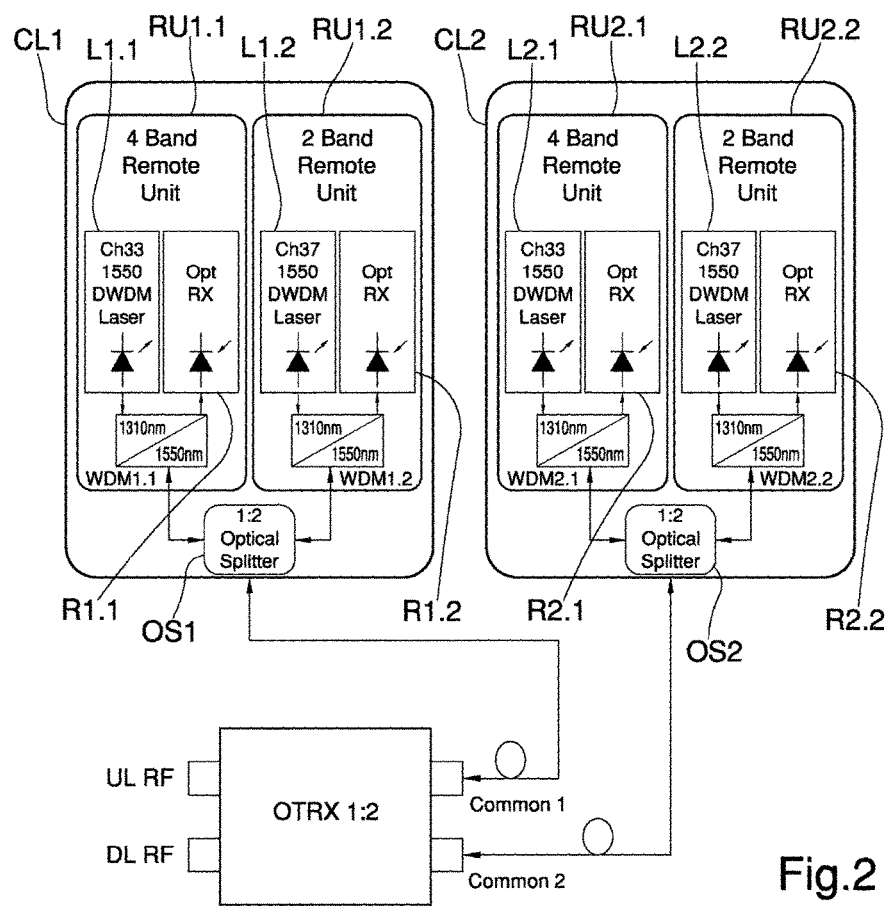
FIG. 1 is a table that illustrates a possible configuration of frequency bands conventionally used for cellular telecommunications.
FIG. 2 is a block diagram that illustrates, by way of example, a possible optical transceiver module of the known type connected to respective Remote Units clusters equipped with optical transmitters of the DWDM type.
Figure 3:
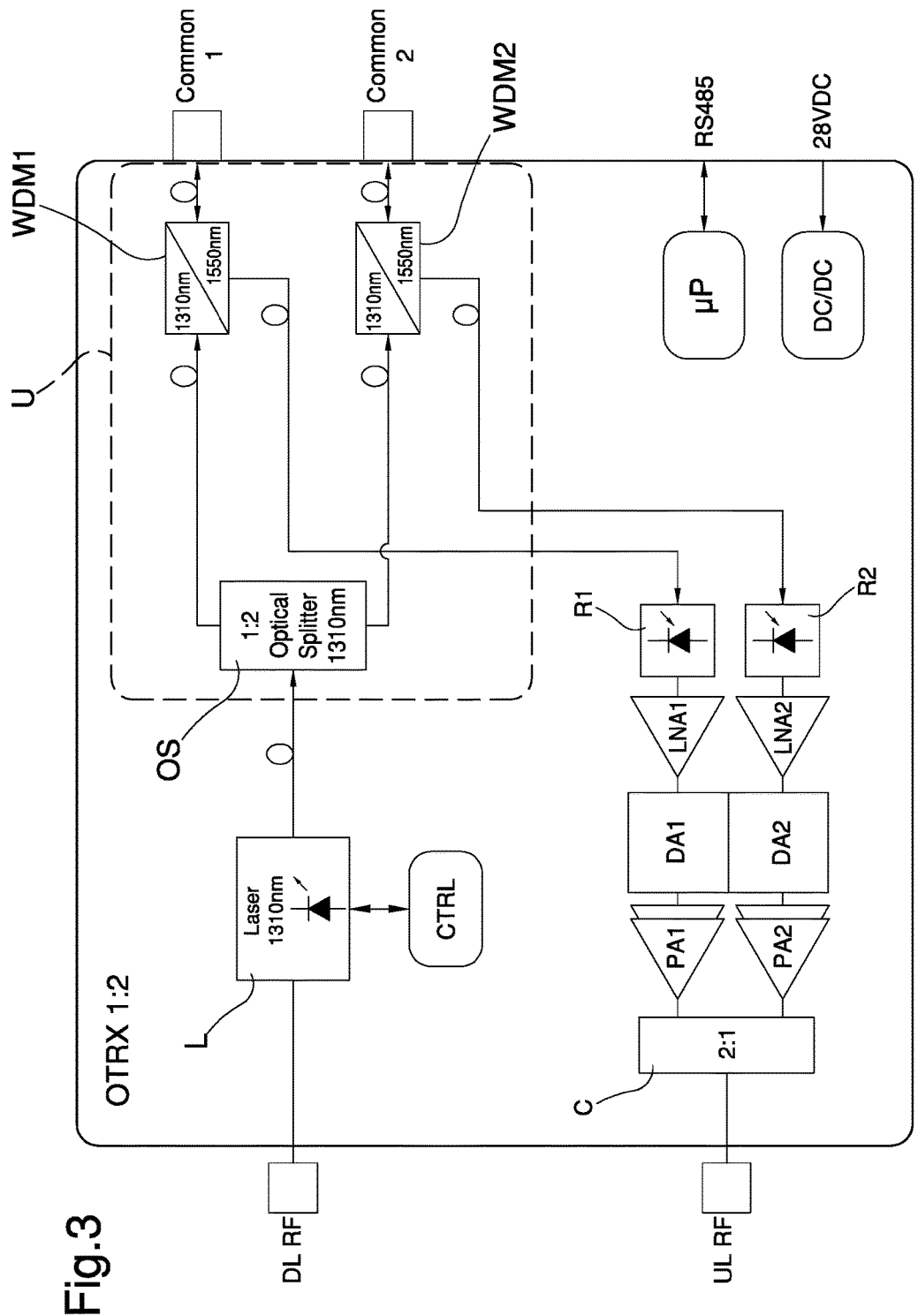
FIG. 3 is a block diagram illustrating in detail an optical transceiver module of a known type.
Figure 4:
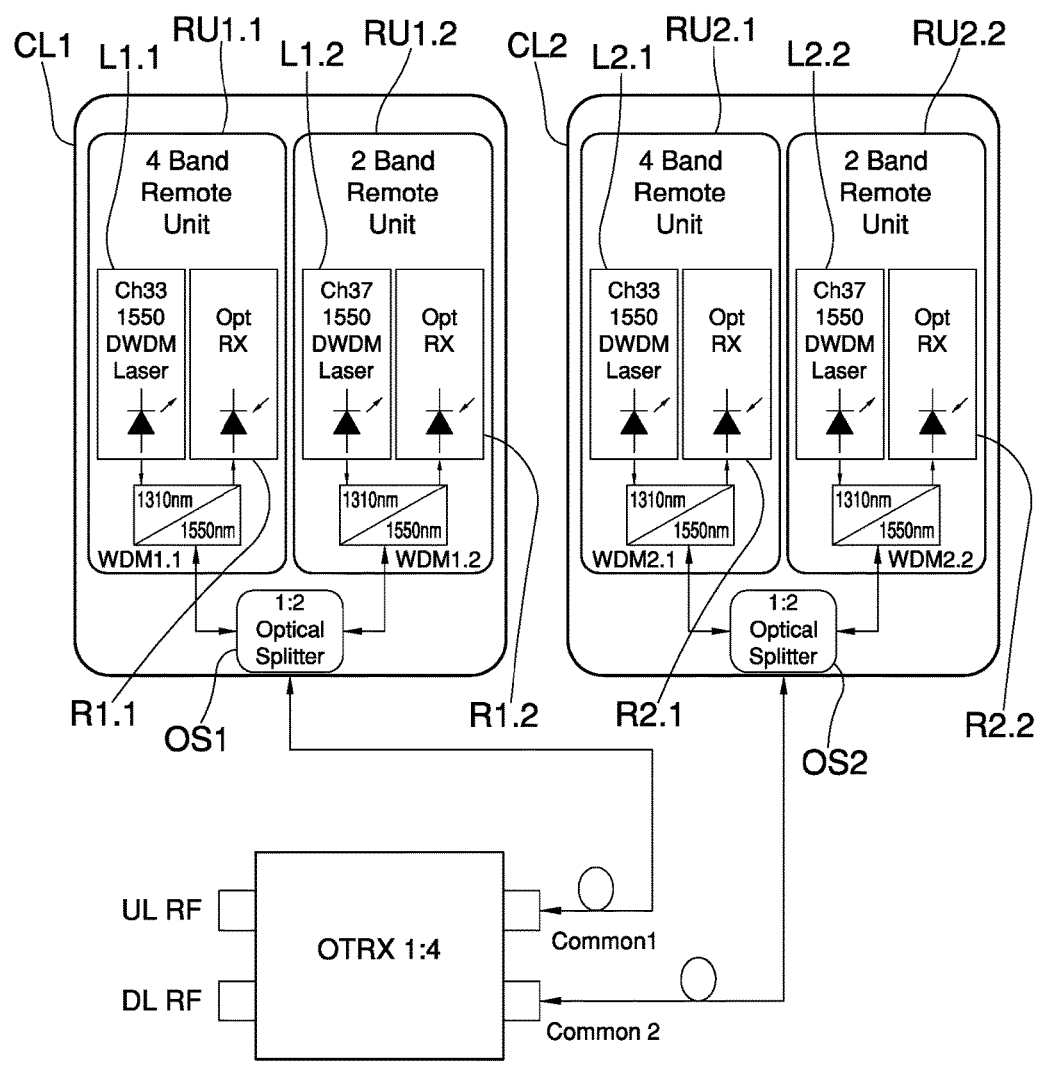
FIG. 4 is a block diagram that illustrates a first possible embodiment of an optical transceiver module according to the invention connected to respective Remote Units clusters equipped with optical transmitters of the DWDM type.
Figure 6:
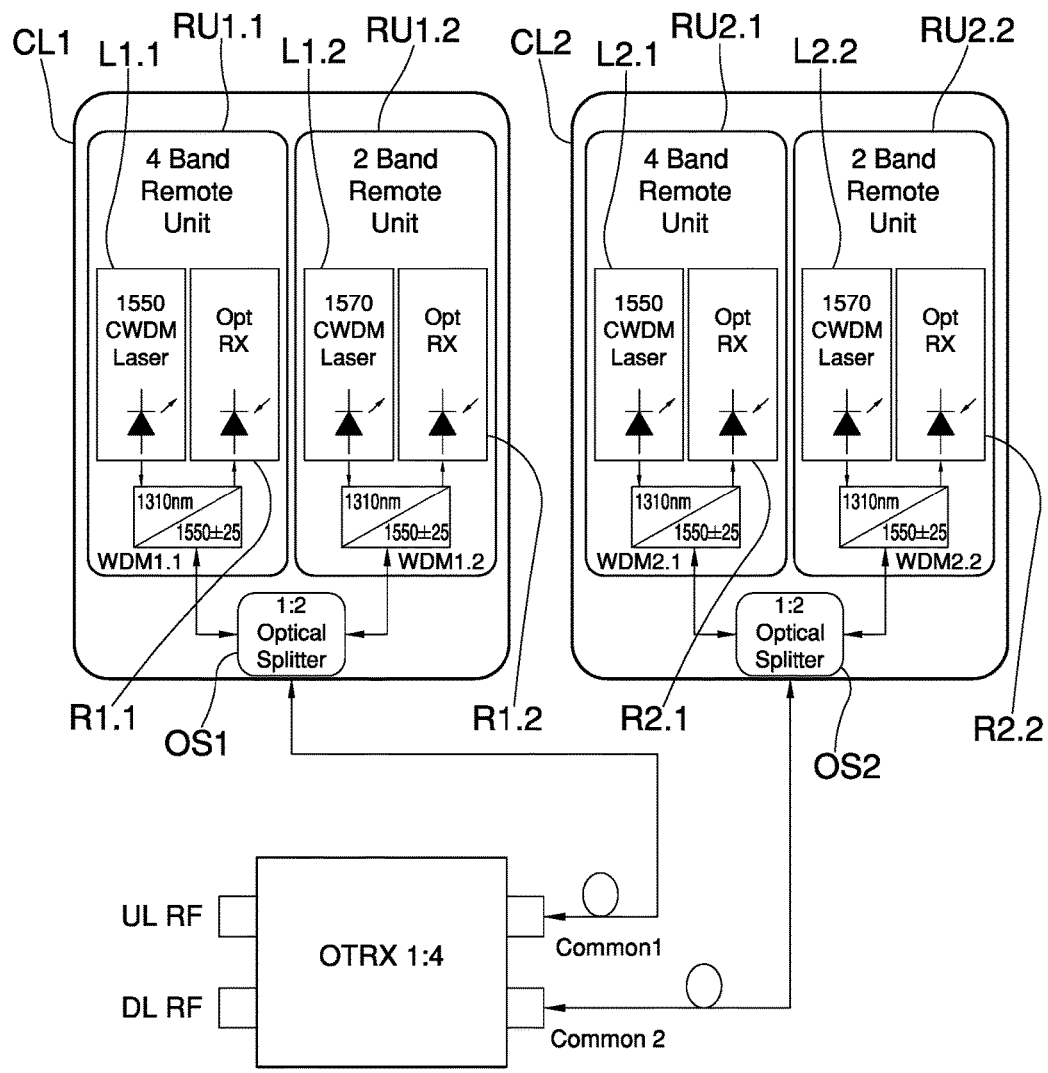
FIG. 6 is a block diagram that illustrates a possible second embodiment of an optical transceiver module according to the invention connected to respective Remote Units clusters equipped with optical transmitters of the CWDM type.

As illustrated schematically in FIGS. 4 and 6, it is for example possible to use the optical transceiver module OTRX 1:4 on the Master Unit side, so as to drive up to two Remote Units for frequency bands 700/800+850/1900/AWS3 (four bands) and up to two Remote Units for frequency bands WCS/LTE2500TDD (two bands).

In particular, on each optical connector COMMON 1 and COMMON 2 may be present a WDM 1310 nm modulation for the downlink signal and a 1550 nm WDM modulation for the uplink signal coming from optical transmitters L1.1, L1.2, L2.1, L2.2 of DWDM (FIG. 4) or CWDM (FIG. 5) type of the Remote Units RU1.1, RU1.2, RU2.1 and RU2.2 present, respectively, in the first cluster CL1 and in the second cluster CL2.

In particular, in the clusters CL1 and CL2 each optical fiber path can be connected to an 1:2 optical splitter OS1 and OS2 (of the 1310/1550 nm type) that feeds each cluster (four bands of the Remote Units RU1.1 and RU2.1 in addition to two bands of the Remote Units RU2.2 and RU1.2).

As shown in the solution of FIG. 4, the four bands Remote Units RU1.1 and RU2.1 may for example be equipped with a DWDM channel 33 (1550.92 nm) optical transmitters L1.1 and L2.1, while the two bands Remote Units RU1.2 and RU2.2 may for example be equipped with a DWDM channel 37 (1547.72 nm) optical transmitters L2.1 and L2.2.

Alternatively, as shown in the solution of FIG. 6, the four bands Remote Units RU1.1 and RU2.1 may for example be equipped with a CWDM 1550 nm optical transmitters L1.1 and L2.1, while the two bands Remote Units RU1.2 RU2.2 may for example be equipped with a CWDM 1530 nm (or 1570 nm) optical transmitters L1.2 and L2.2.

In addition, the Remote Units RU1.1, RU2.1, RU1.2 and RU2.2 are generally equipped, respectively, with optical receivers R1.1, R1.2, R2.1, R2.2 and WDM couplers, indicated in the figures with the references WDM1.1, WDM1.2, WDM2.1, WDM2.2, which connect the optical transmitters/receivers to the 1:2 optical splitters OS1 and OS2.

The optical transceiver module OTRX 1:4 comprises at least one downlink path for the connection between the downlink connector DL RF and the first and second optical connector COMMON 1 and COMMON 2.

Furthermore, the optical transceiver module OTRX 1:4 comprises an uplink patch for the connection between the uplink connector UL RF and the first and second optical connector COMMON 1 and COMMON 2.

Figure 5:
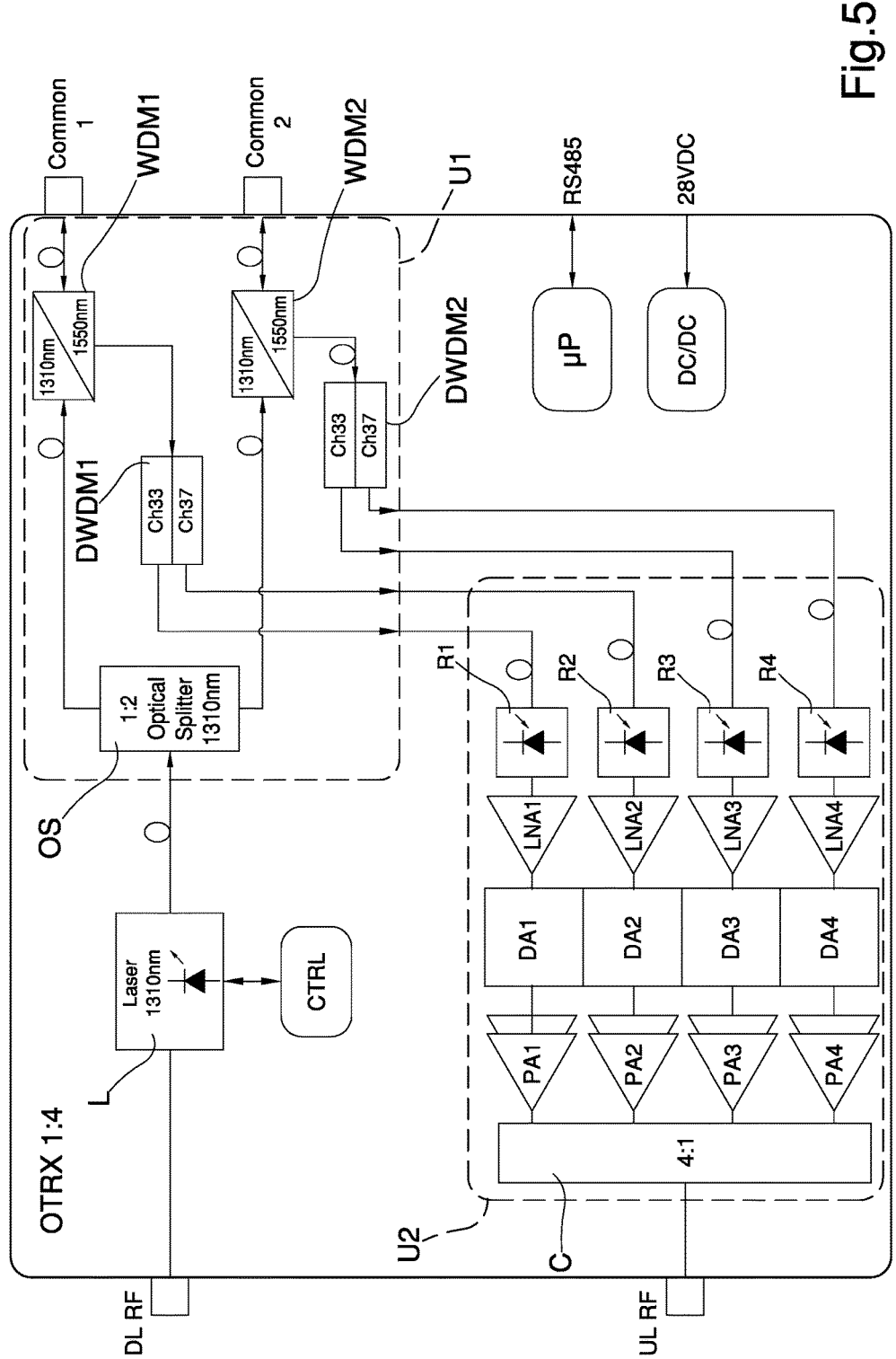
FIG. 5 is a block diagram that illustrates in detail the optical transceiver module of FIG. 4.

As illustrated in detail in FIGS. 5 and 7, respectively related to a first possible embodiment and to a second possible embodiment of the optical transceiver 1:4, the downlink path comprises a laser transmitter L connected to the downlink connector DL RF.

For example, the laser transmitter L may be constituted by a 1310 nm laser.

A control unit CTRL is operatively connected to the laser transmitter L for driving the laser transmitter itself.

The laser transmitter L is connected to an optical unit U1 of transmission/reception. The optical unit U1 includes an optical splitter OS provided with an input connected to the laser transmitter L.

The downlink path ends in a first coupler of the WDM type, indicated in the figures as WDM1, and a second coupler of the WDM type, indicated in the figures as WDM2, connected, respectively, to the first optical connector COMMON 1 and to the second optical connector COMMON 2. The first coupler WDM1 and the second coupler WDM2 are connected to respective outputs of the optical splitter OS.

As illustrated in detail in FIGS. 5 and 7, the first coupler WDM1 and the second coupler WDM2 also belong the uplink path of the optical transceiver module OTRX 1:4.

Furthermore, the uplink path comprises a first demultiplexer DWDM1 or CWDM1 and a second demultiplexer DWDM2 or CWDM2 connected, respectively, to the outputs of the first coupler WDM1 and of the second coupler WDM2.

In particular, according to the first possible embodiment illustrated in FIG. 5, the first demultiplexer DWDM1 and the second demultiplexer DWDM2 are constituted by demultiplexers of the DWDM (Dense Wavelength Division Multiplexing) type.

Alternatively, with reference to the second possible embodiment shown in FIG. 7, the first demultiplexer CWDM1 and the second demultiplexer CWDM2 are constituted by demultiplexers of the CWDM (Coarse Wavelength Division Multiplexing) type.

The first demultiplexer WDDM1 or CWDM1 and the second demultiplexer DWDM2 or CWDM2 are able to separate the four uplink signals coming from the four Remote Units.

The uplink path also comprises a unit for conversion and processing, indicated in FIGS. 5 and 7 with the reference U2, connected at input to the outputs of the first demultiplexer DWDM1 or CWDM1 and the second demultiplexer DWDM2 or CWDM2 and provided with an output connected to the uplink connector UL RF. Such a conversion processing unit U2 is adapted to convert and process the optical signals separated by the first demultiplexer DWDM1 or CWDM1 and by the second demultiplexer DWDM2 or CWDM2 to obtain an RF signal to be sent to the uplink connector UL RF.

Specifically, the uplink path includes four optical receivers R1, R2, R3, R4 connected to respective outputs of the first demultiplexer DWDM1 or CWDM1 and of the second demultiplexer DWDM2 or CWDM2.

Furthermore, the uplink path includes four low-noise amplifiers LNA1, LNA2, LNA3, LNA4 connected downstream of the optical receivers R1, R2, R3, R4.

The uplink path includes four digital attenuators DA1, DA2, DA3, DA4 connected downstream of the low noise amplifiers LNA1, LNA2, LNA3, LNA4.

Furthermore, the uplink path includes four power amplifiers PA1, PA2, PA3, PA4 connected downstream of the digital attenuators DA1, DA2, DA3, DA4.

Finally, the uplink path comprises a combiner C of type of a 4:1 combiner connected to the outputs of the power amplifiers PA1, PA2, PA3, PA4 and provided with an output connected to the uplink connector UL RF.

The following is briefly described the operation of the optical transceiver module OTRX 1:4.

Below the operation of the optical transceiver module OTRX 1:4 is described briefly.

During use, the first and the second optical connector COMMON 1 and COMMON 2 are connected by means of respective fiber optic paths to the two clusters CL1 and CL2 of Remote Units. In particular, each optical fiber path is connected to a respective optical splitter OS1 and OS2 (1310/1550 nm) connected to each of the Remote Units RU1.1, RU1.2, RU2.1, RU2.2, analogously to the known solutions in the state of the art.

On the other side, inside the optical transceiver module OTRX 1:4, the first and the second optical connector COMMON 1 and COMMON 2 are connected to the first and second coupler WDM 1 and WDM2 (1310 nm/1550 nm) in order to separate the 1550 nm uplink signals coming from the Remote Units RU1.1, RU1.2, RU2.1, RU2.2 from 1310 nm downlink signals coming from the base station (from the downlink connector DL RF).

The downlink signals, in particular, come from the optical splitter OS connected to the 1310 nm laser transmitter L.

The uplink signals, however, are directed to the first demultiplexer DWDM1 or CWDM1 and to the second demultiplexer DWDM2 or CWDM2, which divide the CH33 1550 nm or 1550 nm CWDM uplink signals coming from the four bands Remote Units RU1.1 and RU2.1 to the uplink CH37 or 1550 nm CWDM 1530 nm (or 1570 nm) signals coming from the two bands Remote Units and RU1.2 RU2.2.

In this way, the four uplink signals coming from the Remote Units RU1.1, RU1.1, RU2.1 and RU2.2 are made available separately to the four optical receivers R1, R2, R3 and R4.

In particular, R1 receives the uplink signals only from the four bands Remote Unit RU1.1, R2 receives the uplink signals only from the two bands Remote Unit RU1.2, R3 receives the uplink signals only from the four bands Remote Unit RU2.1, while R4 receives the uplink signals only from the two bands Remote Unit RU2.2.

This allows to avoid the intermodulation distortion normally occurring when using the known solutions.

Furthermore, the signals are combined together by the 4:1 combiner C only after an automatic gain control (AGC) effected via the digital attenuators DA1, DA2, DA3, DA4, in order to bring the level of the signals to a level such to avoid intermodulation distortion in the following stages.

Finally, the thus combined signals are made available to the uplink connector UL RF.

In practice it has been observed that the described invention achieves the intended purposes.

In particular, the use of CWDM or DWDM demultiplexers, combined with the use of separate optical receivers, allows eliminating the intermodulation distortions normally present in the known solutions.

What is claimed is:

1. An optical transceiver module for communications in DAS (Distributed Antenna System) systems, installable on the Master Unit side of a DAS system connectable to a plurality of Remote Units, comprising:

at least one uplink connector and at least one downlink connector connectable to at least one radio base station;

at least a first optical connector and at least a second optical connector connectable to said Remote Units;

at least one downlink path for the connection between said downlink connector and said first and second optical connector; and at least one uplink path for the connection between said uplink connector and said first and second optical connector, wherein said uplink path comprises at least a first coupler of the WDM type and at least a second coupler of the WDM type connected, respectively, to said first optical connector and to said second optical connector, wherein said uplink path comprises at least a first demultiplexer and a second demultiplexer connected, respectively, to the outputs of said first coupler and of said second coupler and configured to separate the uplink optical signals coming from each of said Remote Units, and at least one unit for conversion and processing connected to the outputs of said first demultiplexer and of said second demultiplexer and connected to said uplink connector, configured for converting and processing said separated optical signals to obtain an RF signal to be sent to said uplink connector, and wherein said uplink path comprises at least four optical receivers connected to respective outputs of said first demultiplexer and said second demultiplexer.

2. The optical transceiver module according to claim 1, wherein said first demultiplexer and said second demultiplexer are constituted by demultiplexers of the DWDM (Dense Wavelength Division Multiplexing) type.

3. The optical transceiver module according to claim 1, wherein said first demultiplexer and said second demultiplexer are constituted by demultiplexers of the CWDM (Coarse Wavelength Division Multiplexing) type.

4. The optical transceiver module according to claim 1, wherein said uplink path comprises at least four low noise amplifiers connected to said optical receivers.

5. The optical transceiver module according to claim 1, wherein said uplink path comprises at least four digital attenuators.

6. The optical transceiver module according to claim 1, wherein said uplink path includes at least four power amplifiers.

7. The optical transceiver module according to claim 1, wherein said conversion and processing unit comprises at least one combiner adapted to combine the signals coming from said optical receivers.

8. The optical transceiver module according to claim 1, wherein said downlink path comprises at least a laser transmitter connected to said downlink connector.

9. The optical transceiver module according to claim 8, wherein said downlink path comprises at least a control unit operatively connected to said laser transmitter.

10. The optical transceiver module according to claim 8, wherein said downlink path includes at least one optical splitter having an input connected to said laser transmitter.

11. The optical transceiver module according to claim 10, wherein said downlink path comprises said first coupler and said second coupler, and in that said first coupler and said second coupler are connected to respective outputs of said optical splitter.

* * * * *